(12) United States Patent
Nakasuji et al.

(10) Patent No.: US 8,166,656 B2
(45) Date of Patent: May 1, 2012

(54) METHOD AND APPARATUS FOR WORKING A SCREW ROTOR, END MILL FOR WORKING, AND METHOD OF MANUFACTURING A SCREW COMPRESSOR

(75) Inventors: Tomoaki Nakasuji, Chiyoda-ku (JP); Yusaku Miyamoto, Chiyoda-ku (JP); Yasunori Matsumoto, Chiyoda-ku (JP); Tetuji Kawakami, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 964 days.

(21) Appl. No.: 12/170,551

(22) Filed: Jul. 10, 2008

(65) Prior Publication Data
US 2009/0217528 A1 Sep. 3, 2009

(30) Foreign Application Priority Data
Feb. 29, 2008 (JP) .................... 2008-50136

(51) Int. Cl.
*B21D 43/00* (2006.01)
*B21D 53/28* (2006.01)
*B23P 15/00* (2006.01)

(52) U.S. Cl. ............. 29/893.31; 29/2.25; 29/888.025; 29/893.35; 74/458

(58) Field of Classification Search .......... 29/2.1, 29/2.25, 888.023, 893.31, 893.35; 74/325, 74/458, 462; 418/195, 197, 201.1
See application file for complete search history.

(56) References Cited

U.S. PATENT DOCUMENTS

| | | | |
|---|---|---|---|
| 5,084,965 A | 2/1992 | Zimmern | |
| 6,122,824 A * | 9/2000 | Jensen | 29/888.023 |
| 7,216,407 B2 * | 5/2007 | Yonemaru | 29/27 C |
| 7,979,988 B2 * | 7/2011 | Shiino et al. | 29/893.31 |
| 2006/0048360 A1 * | 3/2006 | Yonemaru | 29/27 C |
| 2011/0097232 A1 * | 4/2011 | Miyamura et al. | 418/195 |

FOREIGN PATENT DOCUMENTS

| | | |
|---|---|---|
| WO | WO 92/18278 | 10/1992 |
| WO | WO 2004/089569 A1 | 10/2004 |

* cited by examiner

*Primary Examiner* — Alexander P Taousakis
(74) *Attorney, Agent, or Firm* — Buchanan Ingersoll & Rooney PC

(57) ABSTRACT

A method of improving working of grooves of a screw rotor, in particular, working of grooves side in working efficiency, a working apparatus, a working tool, and a method of manufacturing a screw compressor are provided. A method of controlling rotation of a work and turning of a tool at a time to form a screw tooth space based on a five-axis NC machine, and a special end mill having a cutting edge of a short length and a neck portion provided between the cutting edge and a shank portion to be made thin is used to perform working in grooves side finish working process.

3 Claims, 13 Drawing Sheets

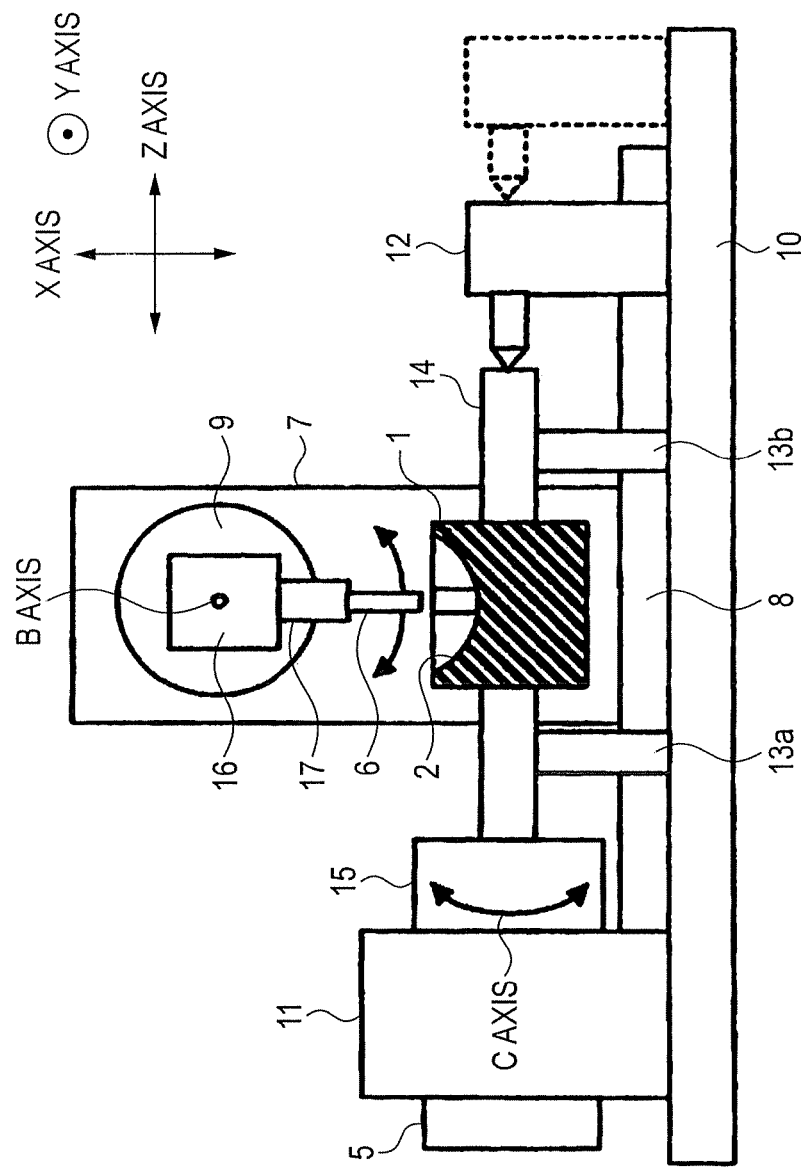

FIG. 6A
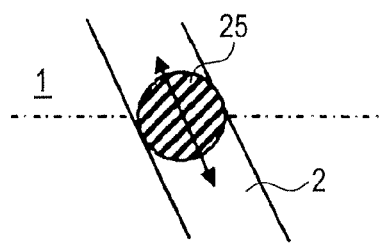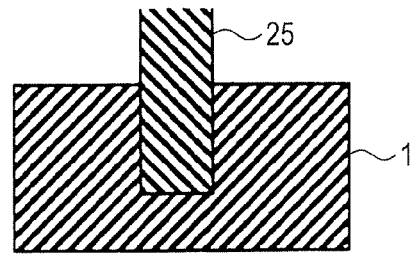
FIG. 6B
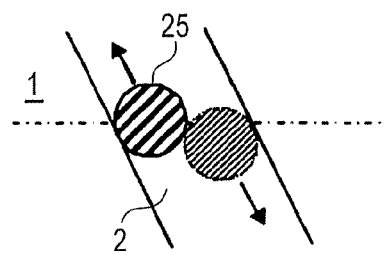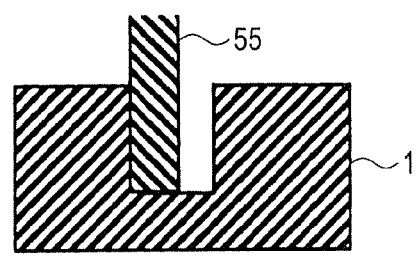
FIG. 6C
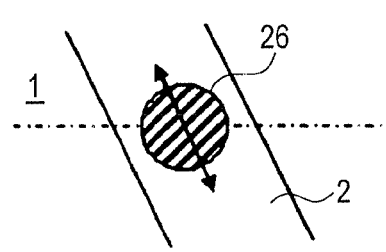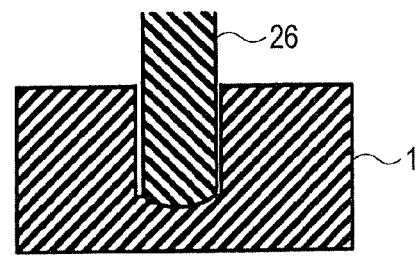
FIG. 6D
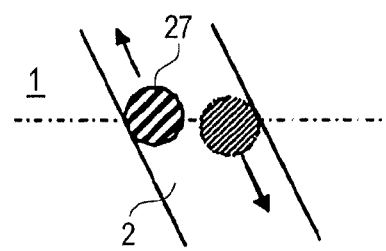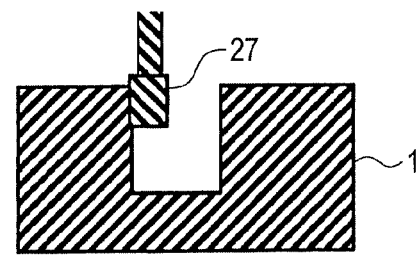
FIG. 6E
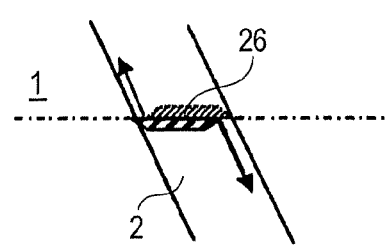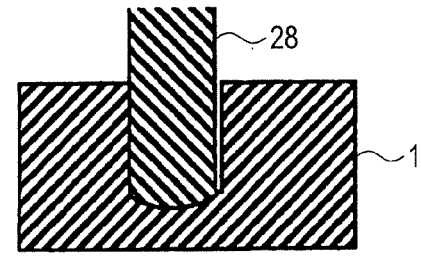

FIG. 11
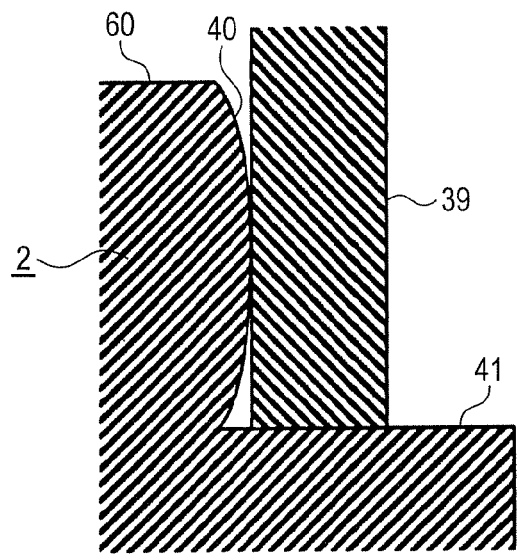
FIG. 12
TOOL DIAMETER AND ERROR
| TOOL DIAMETER (mm) | φ15 | φ10 | φ8 | φ7 | φ6 | φ5 | φ4 |
|---|---|---|---|---|---|---|---|
| ERROR (mm) | 0.233 | 0.155 | 0.124 | 0.109 | 0.093 | 0.078 | 0.062 |
FIG. 13
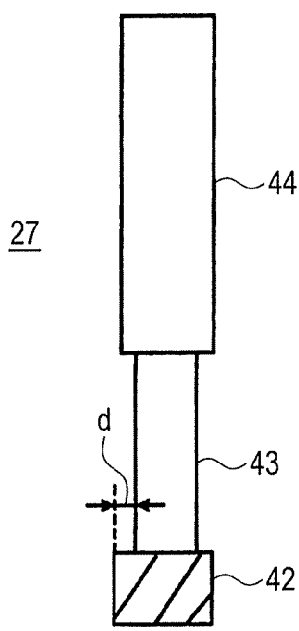

METHOD AND APPARATUS FOR WORKING A SCREW ROTOR, END MILL FOR WORKING, AND METHOD OF MANUFACTURING A SCREW COMPRESSOR

BACKGROUND OF THE INVENTION

The present invention relates to a method of and an apparatus for working a screw rotor incorporated into a screw compressor, and more particular, to a method of and an apparatus for working a screw rotor, in which working of grooves is enabled in high accuracy and in high efficiency, an end mill used therefore, and a method of manufacturing a screw compressor.

In working of grooves of a screw rotor incorporated into a single screw compressor, there is conventionally known a method of setting a work material on a first axis of rotation, setting a tool on a second axis of rotation perpendicular to the first axis of rotation, rotating the two axes in synchronism, and further increasing a turning radius of the tool, minute by minute, set on the second axis of rotation as working proceeds, thereby forming grooves shape of a screw rotor (see, for example, JP-T-6-506640).

However, a finish tool used in JP-T-6-506640 is a formed tool, which is especial in shape in order to prevent interference in other locations than a point of cutting. Also, since a formed tool is used to perform shaving working, cutting resistance at a space bottom becomes large and minute cutting is forced to perform, so that an obstacle is put in shortening of working time and an improvement in tool life.

On the other hand, in order to solve the problems described above, there is separately proposed realization of working of a screw rotor in a general-use facility, in which a commercial five-axis NC machine is used as a base machine, rough working with an end mill tool is heightened in efficiency, and circular movements of two perpendicular axes are added to increase a turning radius of the tool (see, for example, International Publication No. WO2004/089569).

With JP-T-6-506640, however, shaving working with a tool of a specific shape is performed in grooves side finish working out of working of grooves of a screw rotor, so that it is necessary to manufacture a tool of a specific shape in conformity to a product shape. Also, on account of a specific shape, an error is liable to generate in setting of coordinates of a tool cutting edge position, so that there is a need of correction in dummy working and an adjustment jig. Also, on account of shaving working, in which a work material and a tool move in synchronism, the relative speed of the work material and the tool makes a cutting speed to cause a problem that high speed cannot be desired and an increase in working efficiency cannot be achieved.

Also, the working method as in International Publication No. WO2004/089569 involves a problem that an exclusive facility is necessary and a screw rotor cannot be produced due to stoppage of working in a working apparatus.

The invention has been thought of in view of the problems and has its object to provide a method of improving working of grooves of a screw rotor, in particular, working of grooves side in working efficiency, a working apparatus, a working tool, and a method of manufacturing a screw compressor.

A method of working a screw rotor, according to the invention, has a feature in a method of working a screw rotor by controlling at least two axes, that is, rotation of a work and turning of a tool at a time to form a screw tooth space, the method comprising a first step of using a first end mill as the tool to make a predetermined cut in a depth direction of the screw tooth space to perform engraving to a predetermined depth, a second step of using a second end mill, which has a smaller diameter than that of the first end mill, as the tool to perform rough working on a side of the screw tooth space, a third step of using a third end mill, which has a rounded tip end, as the tool to perform rough working on a bottom surface of the screw tooth space, a fourth step of using a fourth end mill, which has a cutting edge portion being shorter than a depth of the screw tooth space in a depth direction and a neck portion being smaller in diameter than the cutting edge portion, as the tool to perform finish working on the side of the screw tooth space, and a fifth step of using a shaving byte, which is shaped in conformity to the bottom surface of the screw tooth space, as the tool to perform finish working on the bottom surface of the screw tooth space.

Also, a method of working a screw rotor, according to the invention, has a feature in a method of working a screw rotor by controlling at least two axes, that is, rotation of a work and turning of a tool at a time to form a screw tooth space, the method comprising a first step of using a first end mill as the tool to make a predetermined cut in a depth direction of the screw tooth space to perform engraving to a predetermined depth, a second step of using a second end mill, which has a smaller diameter than that of the first end mill, as the tool to perform rough working on a side of the screw tooth space, a third step of using a third end mill, which has a rounded tip end, as the tool to perform rough working on a bottom surface of the screw tooth space, a fourth step of using a sixth end mill, which is smaller in diameter than the first end mill, as the tool to perform finish working on the side of the screw tooth space with a cutter pass, in which working is divided into a shorter depth than a depth of the screw tooth space in a depth direction and a tool center is moved so as to contact with both lead at a tip end of the sixth end mill and lead on an outside diameter surface of the work, and a fifth step of using a shaving byte, which is shaped in conformity to the bottom surface of the screw tooth space, as the tool to perform finish working on the bottom surface of the screw tooth space.

Since a rotating tool is used for the finish working of grooves side according to the invention, the number of rotation can be heightened to be equal to that in an ordinary end mill working and it is not necessary to use a shaving byte having a specific shape, so that working is made high in efficiency. Also, since the tool is of rotational symmetry, a cutting edge position becomes easy to measure to heighten the tooth space width in accuracy as compared with a shaving byte of a specific shape. As compared with a shaving byte of a specific shape, there is produced an effect that a tool is simple to work, or the like.

BRIEF DESCRIPTION OF THE DRAWINGS

FIG. 3 is a view showing a configuration of a screw rotor working apparatus;

FIG. 6 is a demonstration view showing a working process of a screw rotor;

FIG. 11 is a schematic view showing a form error of grooves side in end mill working;

FIG. 12 is a view illustrating an example of the relationship between a tool diameter and a form error of grooves side;

FIG. 13 is a front view showing an example of an end mill, for tooth space side finish working, according to Embodiment 1 of the invention;

DESCRIPTION OF THE PREFERRED EMBODIMENT

Embodiment 1

Figure 1:
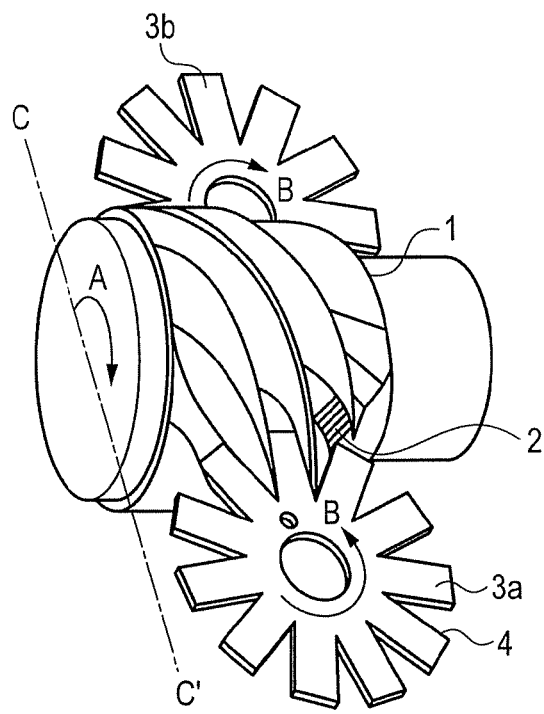
FIG. 1 is a perspective view showing the principle of compression for a single screw compressor.

First, the principle of compression in a single screw compressor will be described with reference to FIG. 1. With a single screw compressor, a screw rotor 1 having a plurality of tooth spaces 2 and gate rotors 3a, 3b having a plurality of teeth 4 are arranged left-right symmetrically with axes thereof perpendicular to each other. FIG. 1 shows the case where the screw rotor 1 has six tooth spaces 2 and the gate rotors 3a, 3b have eleven teeth 4. An outer periphery of the screw rotor 1 is covered by a casing (not shown) and a closed space is defined by the tooth spaces 2 of the screw rotor 1, the teeth 4 of the gate rotors 3a, 3b, and an inside diameter of the casing. Refrigerant gases are sucked into the tooth spaces 2 in a certain position on the screw rotor 1 and the gate rotors 3a, 3b rotating together with rotation of the screw rotor 1 close the tooth spaces 2 to confine the refrigerant gases.

Figure 2:
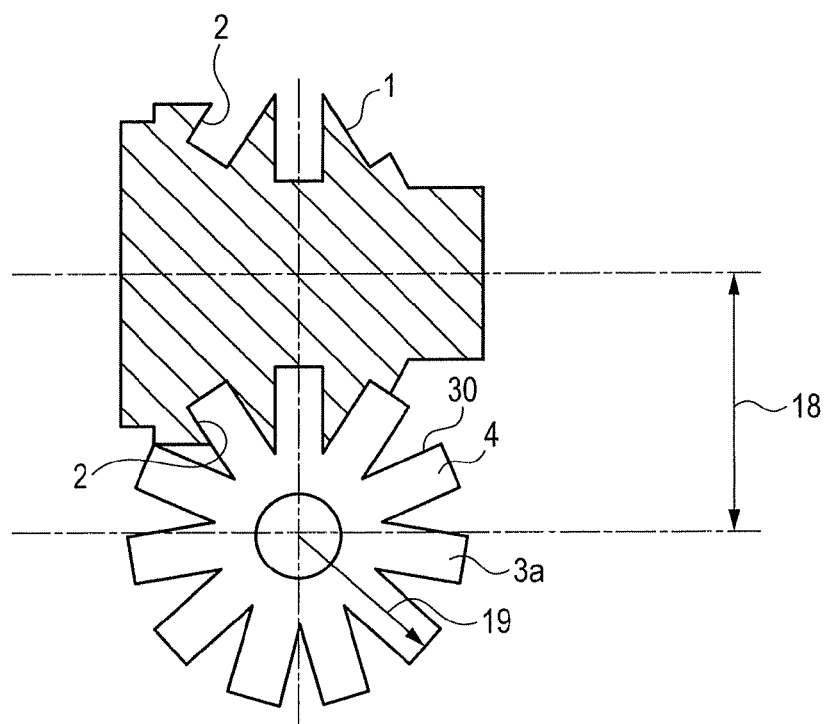
FIG. 2 is a cross sectional view taken along the line C-C' in FIG. 1.

When the screw rotor 1 rotates further, grooves volume of a closed space defined by the tooth spaces 2 of the screw rotor 1, the teeth 4 of the gate rotors 3a, 3b, and the casing is decreased to compress the refrigerant gases. When the screw rotor 1 rotates further to give a predetermined tooth space volume, compressed refrigerant gases are jetted from an opening. This cycle is repeated for the respective tooth spaces and so compression is consecutively performed. In addition, FIG. 2 shows a cross section taken along the line C-C' in FIG. 1 and shows how the teeth 4 of the gate rotor 3a mesh with the tooth spaces 2 of the screw rotor 1 (the casing is not shown).

Subsequently, a working apparatus for working of the screw rotor 1 will be described with reference to an apparatus configuration of FIG. 3. The working apparatus is a NC apparatus capable of penta-axial driving with the use of a C-axis spindle 5 for rotation of the screw rotor 1 being a work piece, a X-axis (vertical direction) movable stage 7 for movement of a tool 6 in a direction perpendicular to the C axis, a Z-axis movable stage 8 in parallel to the X axis, a Y-axis movable stage (not shown) perpendicular to both the X axis and the Z axis, and a B-axis rotating table 9, by which the tool 6 is rotated about a B axis in an arrow direction in the figure. Mounted on a bed 10 are a C-axis spindle stock 11 with the C-axis spindle 5 mounted thereon, the Z-axis movable stage 8, a movable tail stock 12, and dampers 13a, 13b.

While the screw rotor 1 is fixed through a shaft 14 to the C-axis spindle stock 5 with a C-axis chuck 15, the movable tail stock 12 and the dampers 13a, 13b bear the shaft 14 in order to suppress deformation caused by a load at the time of work in case of performing a further accurate work. Mounted on the Z-axis movable stage 8 are the X-axis movable stage 7, the Y-axis movable stage (not shown), and the B-axis rotating table 9, and mounted on the B-axis rotating table 9 is a spindle 16, which rotates the tool 6 and a tip end of which mounts thereto the tool 6 through a holder 17.

Subsequently, the principle of working in the working apparatus will be described with reference to FIG. 4. The tooth spaces 2 of the screw rotor 1 is worked by replacing the teeth 4 of the gate rotor 3 described in the principle of compression by the tool 6. That is, the C-axis spindle 5 rotates the screw rotor 1 and the B-axis rotating table 9 rotates the tool 6 in synchronism with rotation of the screw rotor 1. In order to obtain the screw rotor 1 shown in FIGS. 1 and 2, synchronism is achieved with a ratio of rotation of the screw rotor 1 on the C-axis and the circular motion of the tool 6 being 6:11. Also, a distance 22 between a center 20 of rotation of the tool 6 and a center 21 of rotation of the screw rotor 1 corresponds to a center distance 18 (see FIG. 2) of the screw compressor and a turning radius 23 of the tool 6 corresponds to a gate rotor radius 19.

Figure 4A:
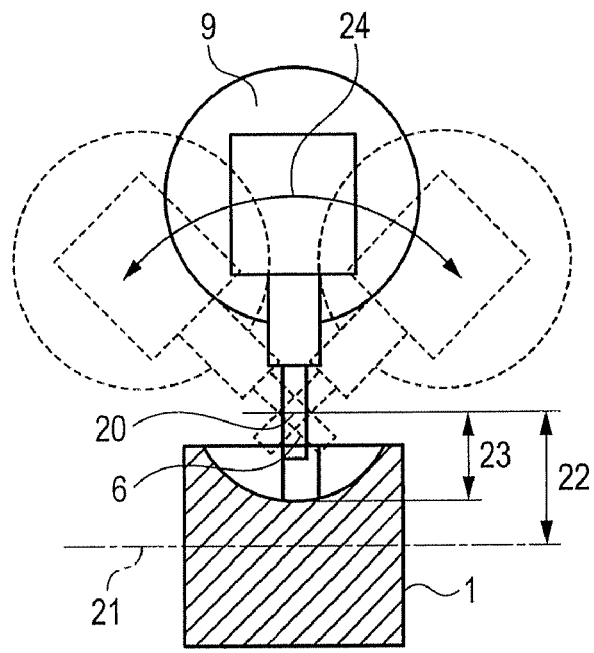
FIG. 4 is a view illustrating an axis movement at the time of working of a screw rotor.
Figure 4B:
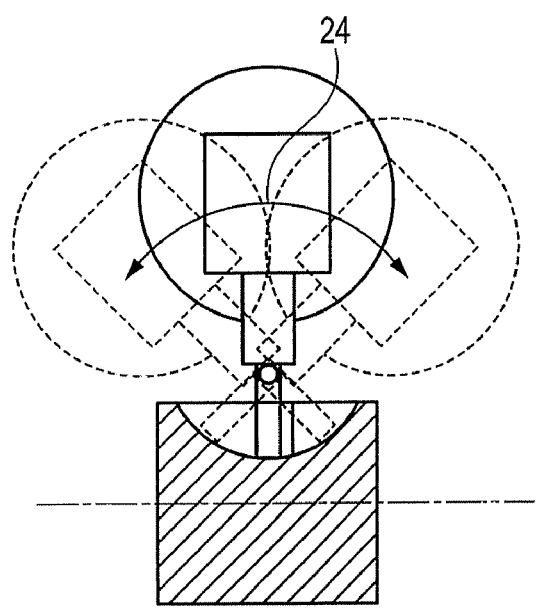

As shown in FIG. 4, when the tooth spaces 2 are engraved, the X-axis movable stage 7 and the Z-axis movable stage 8 drivingly control a center position (B axis) of the B-axis rotating table 9 to move the same on circular-arc tracks 24a, 24b so as to sequentially change the turning radius 23 of the tool 6 from a state of FIG. 4(a), without changing the center 20 of rotation of the tool 6, to make a final radius thereof equal to the gate rotor radius 19 (see FIG. 4(b)). It suffices that deviation from a center line of the screw rotor 1 be corrected and controlled by a Y axis of the working apparatus.

Figure 5:
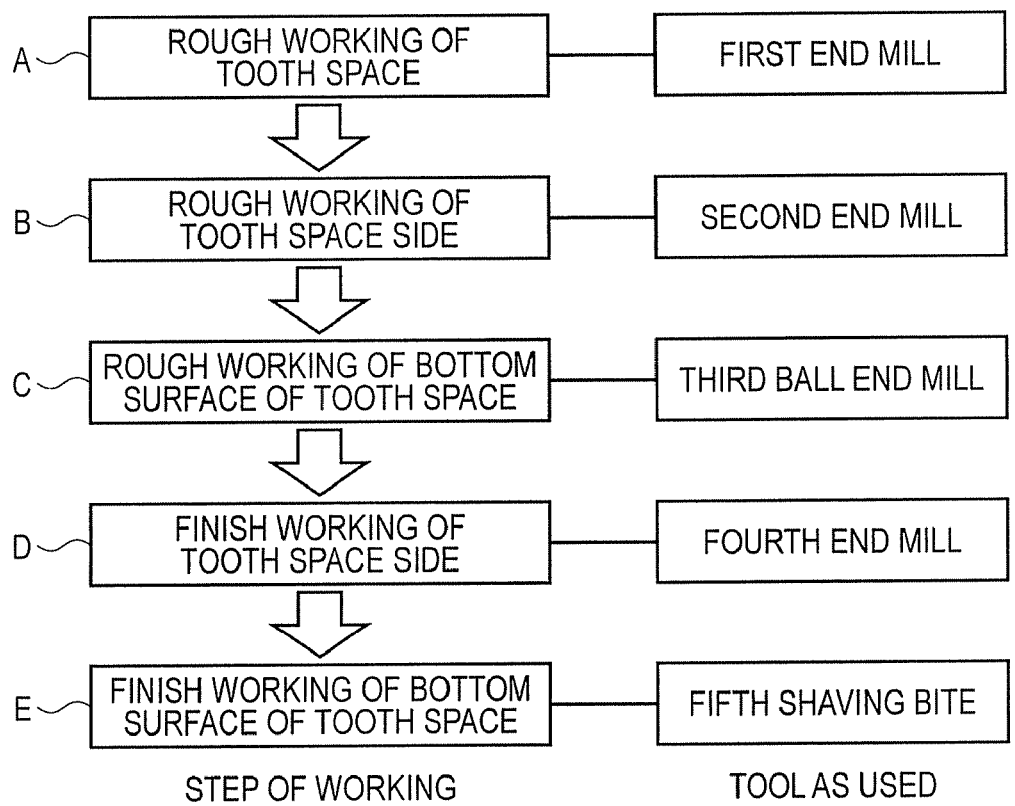
FIG. 5 is a flowchart showing a working process of a screw rotor.
Figure 7:
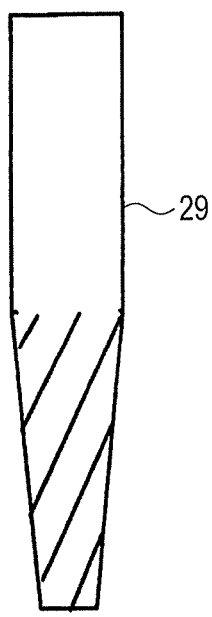
FIG. 7 is a front view showing a tapered end mill for rough working.

Subsequently, that process, in which the working apparatus is used to work the tooth spaces 2 of the screw rotor 1, and a tool as used will be described with reference to FIGS. 5 and 6. A worked parent material for the screw rotor 1 is solid or hollow-columnar. First, a first end mill 25 as a tool is revolved to roughly work grooves 2. In the rough working process A, both sides of the tooth space 2 are worked at a time corresponding to a required tooth space shape by fluting with the first end mill 25 to provide for a cut of a predetermined value in grooves depth direction to engrave the material to a required depth (FIG. 6(a)). At this time, when a tool diameter as close to the required tooth space shape as possible is used, an after process is shortened in working time. Also, when a tapered end mill 29 having a thin tip end as shown in FIG. 7 is used, the required shape is approached further and shortening in working time is made possible. In the case where a worked parent material is hollow, a rotating shaft may be inserted thereinto.

Subsequently, a second general-use end mill 55 having a smaller diameter than that of the first end mill 25 for rough working is used to roughly work sides of the tooth space 2 (FIG. 6(*b*)). In the tooth space side rough working process B, the tooth space 2 is worked one side by one side to be increased in space width to achieve an improvement in working accuracy. Cut is given separately in two directions, that is, a space depth direction and a space width direction and working is performed by driving in plural times. Since the tooth space 2 of the screw rotor 1 together with tooth sides 30 of the gate rotor 3 seal refrigerant gases as shown in FIG. 2, it is ideal that the shape of the tooth sides 30 of the gate rotor 3 is the same as the side shape of the tooth space 2 of the screw rotor 1.

Figure 8:
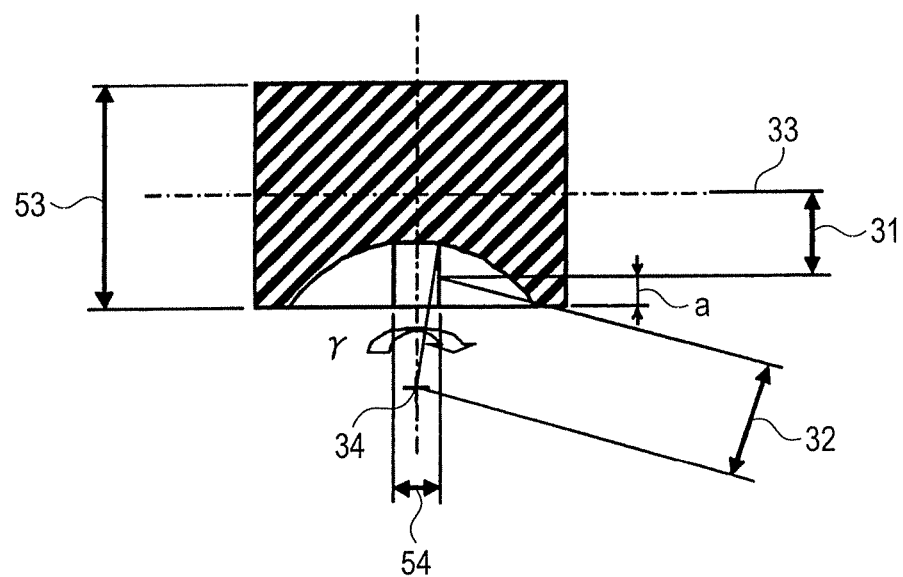
FIG. 8 is a view illustrating the relationship between a turning radius of grooves side and a turning radius of a grooves side with tooth space depth.
Figure 9:
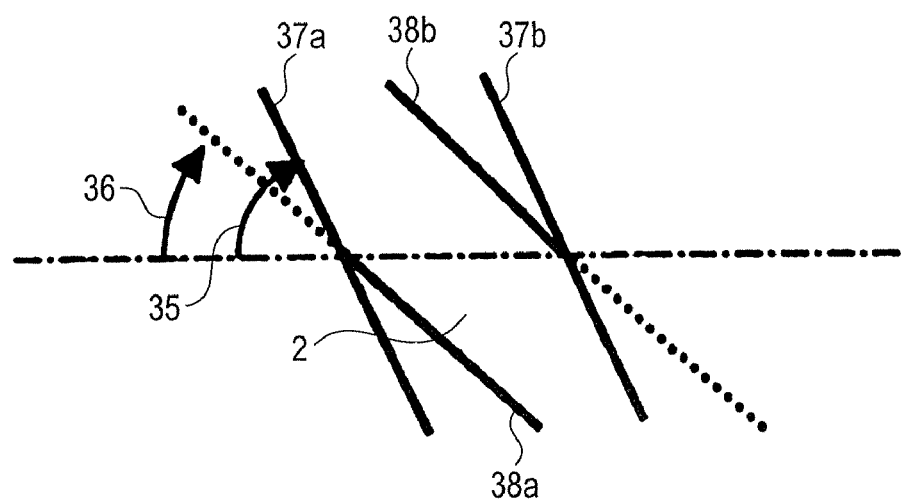
FIG. 9 is a view illustrating changes of a lead angle with tooth space depth.

FIG. 8 shows the relationship between a turning radius 31 of the tooth space side at grooves depth a and a turning radius 32 of the tooth side and in the figure, the reference numeral 33 denotes a center of rotation of the screw rotor 1 and 34 a center of rotation of the gate rotor 3. Also, FIG. 9 shows changes in lead angle with tooth space depth, the reference numerals 37*a*, 37*b* denote lead on an external surface of the screw rotor 1, and 38*a*, 38*b* lead on grooves bottom. On the principle of compression, depending upon a space depth position, the tooth space turning radius 31 in the space depth position and the tooth turning radius 32 in the space depth position are different from each other as shown in FIGS. 8 and 9, so that the tooth space 2 is varied in lead angle according to a space depth. That is, since the tooth space turning radius 31 is large and the tooth turning radius 32 is small on the external surface of the screw rotor 1, a lead angle 35 on the external surface becomes large and since conversely, the tooth space turning radius 31 is small and the tooth turning radius 32 is large on the bottom of the tooth space 2, a lead angle 36 on the tooth space bottom becomes small.

Figure 10:
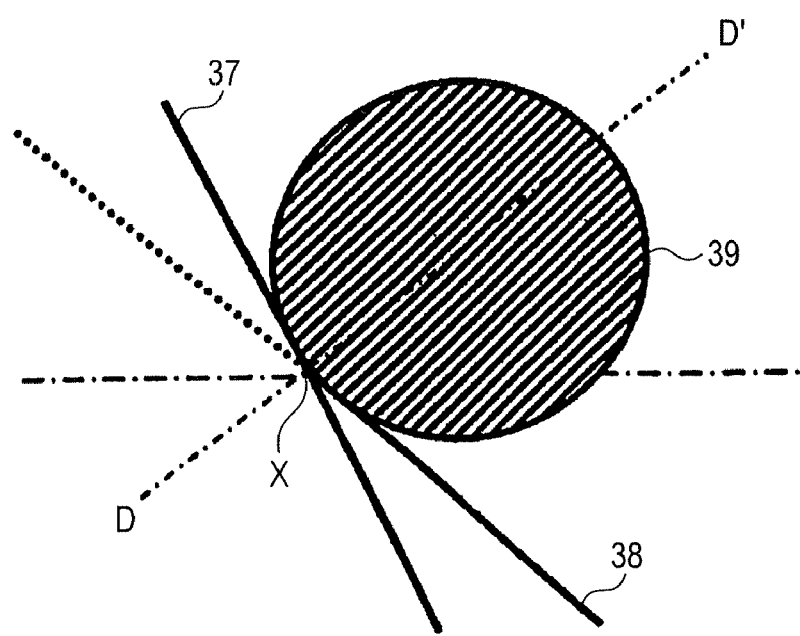
FIG. 10 is a view illustrating an error of grooves side in end mill working.

FIG. 10 is a view illustrating an error of grooves side in end mill working, and a distance from a point X of intersection of a lead 37 on an external surface 60 and a lead 38 on grooves bottom 41 to an outer periphery of an end mill 39 makes a maximum form error such that the smaller a tool diameter, the smaller a form error of grooves side. FIG. 11 shows a form error of grooves side as viewed in cross sectional view taken along the line D-D' in FIG. 10, the reference numeral 40 denotes grooves side, and 41 grooves bottom. In addition, FIG. 12 shows examples of comparison in maximum errors on a tool diameter for grooves of the same shape and reveals that the smaller a tool diameter, the smaller a form error of grooves side.

Subsequently, returning to FIG. 6, a third ball end mill 26 having a rounded (R) tip end is used to roughly work grooves bottom (FIG. 6(*c*)). In the working process C, working is performed over one pass to several passes in grooves center position. Since a space bottom radius is equal to a gate rotor radius, a working load in a bottom finish working can be reduced to lead to an improvement in working accuracy when an elliptical ball end mill having a larger radius of curvature than that of an end mill diameter is used.

Figure 14:
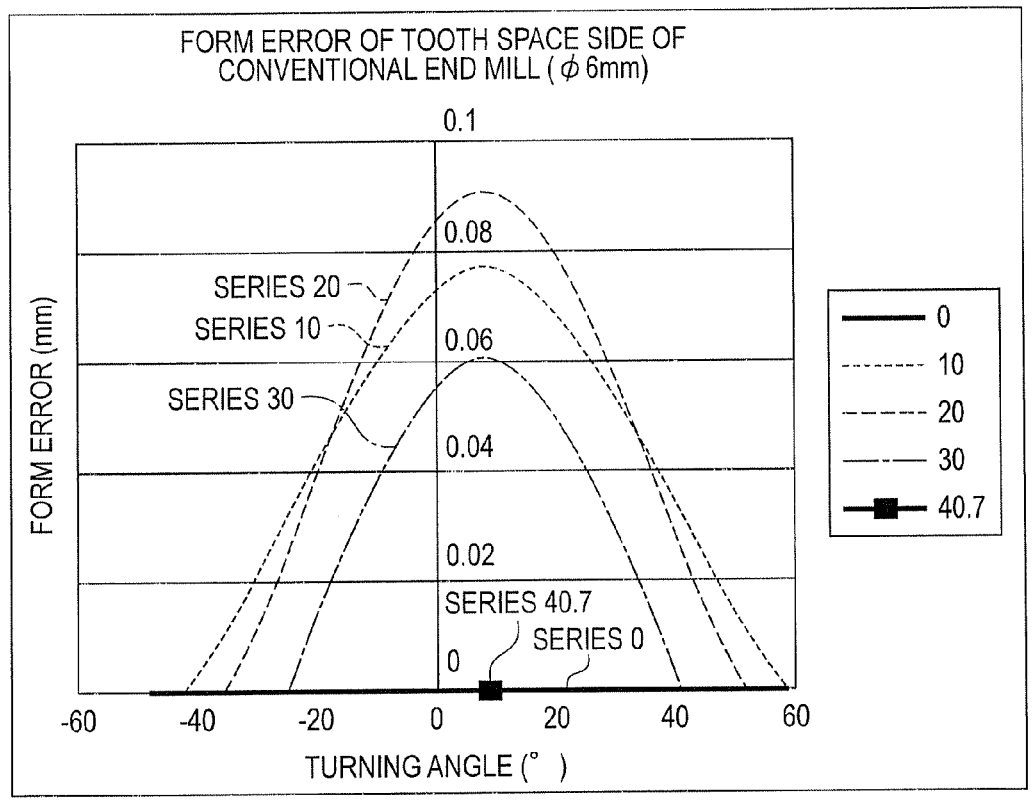
FIG. 14 is a graph indicating form errors of grooves side with a conventional end mill.
Figure 15:
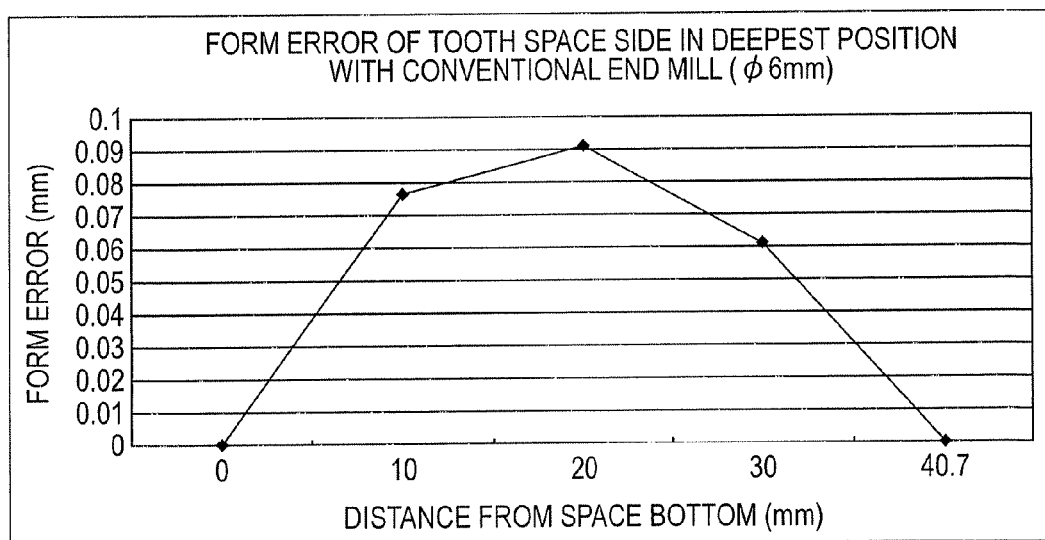
FIG. 15 is a graph indicating form errors of grooves side in a deepest position with a conventional end mill.

Succeedingly, a fourth end mill 27 having a particular shape is used to perform a finish working D on grooves side (FIG. 6(*d*)). FIG. 13 shows an example of a shape of the fourth end mill 27. The fourth end mill 27 comprises a cutting edge 42, a neck portion 43, and a shank portion 44 and has a feature in that the cutting edge 42 is shorter than grooves depth and the neck portion 43 has a smaller diameter than that of the cutting edge 42 as compared with the first end mill. Here, a dented dimension d is made ½ of a difference between a diameter of the cutting edge 42 and a diameter of the neck portion 43. A conventional end mill having no dented dimension d generates a geometric form error on grooves side. FIGS. 14 and 15 show results of calculation with specific values. FIG. 14 is a graph indicating form errors of grooves side with a conventional end mill having a cylindrical shape of φ6, an axis of abscissa in the graph indicates a turning angle γ shown in FIG. 8, and a position perpendicular to an axis of rotation of a screw rotor corresponds to 0. An axis of ordinate indicates a form error representative of deviation from a target shape. Five kinds of lines and points indicate different distances from a screw rotor space bottom and 40.7 corresponds to a deepest position to be present in a single point. Also, since grooves has a width, the form error is maximum in value at about a turning angle of 10 degrees.

FIG. 15 is a graph indicating form errors of grooves side in a deepest position with a conventional end mill having a cylindrical shape of φ6, the graph showing FIG. 11 quantitatively and plotting points where the form error is maximum in value at about a turning angle of 10 degrees. An axis of abscissa indicates distances from a screw rotor space bottom and an axis of ordinate indicates form errors representative of deviation from a target shape. It is found that in case of performing side working of a depth of 40.7 mm with the use of an end mill having a cylindrical shape of φ6 mm, a geometric form error is 90 μm at maximum. Further, on account of grooving with an aspect ratio of 6.7, a work error due to disturbance such as a working load or the like is involved and so working with high accuracy is not desired.

Figure 16:
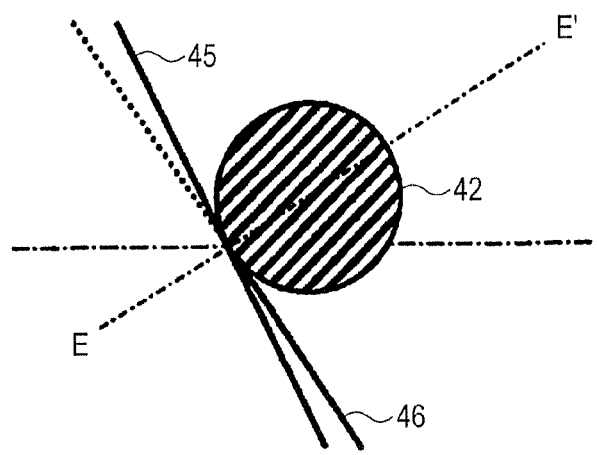
FIG. 16 is a view illustrating the relationship between lead and a tool position when grooves side is worked in end mill working in the invention.
Figure 17:
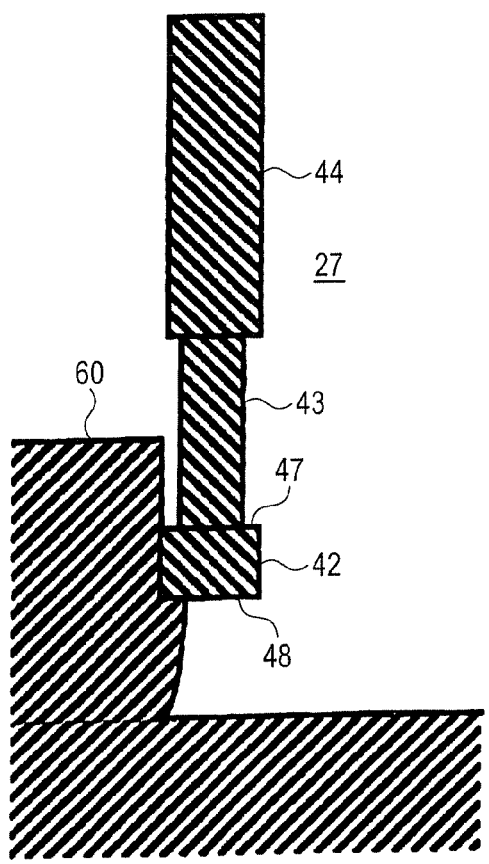
FIG. 17 is a view showing an axial cut position when grooves side is worked in end mill working according to Embodiment 1 of the invention.

In contrast, an explanation will be given to working with the fourth end mill 27 according to the invention. FIG. 16 is a view illustrating the relationship between lead and a tool position when grooves side is worked in working with the use of the fourth end mill and FIG. 17 shows an axial cut position as viewed in cross sectional view taken along the line E-E' in FIG. 16. That is, working is divided in grooves depth direction by a length, which corresponds to the cutting edge 42 of the fourth end mill 27, and a cutter pass at that time sets the fourth end mill 27 in a position, in which both a cutting edge upper lead 45 (45 is a straight line in a direction perpendicular to the figure and so not shown) generated by a cutting edge upper portion 47 and a cutting edge lower lead 46 (46 is a straight line in a direction perpendicular to the figure of FIG. 17 and so not shown) generated by a cutting edge lower portion 48 define a line tangent to an outer periphery cylinder portion of the cutting edge 42.

Figure 18:
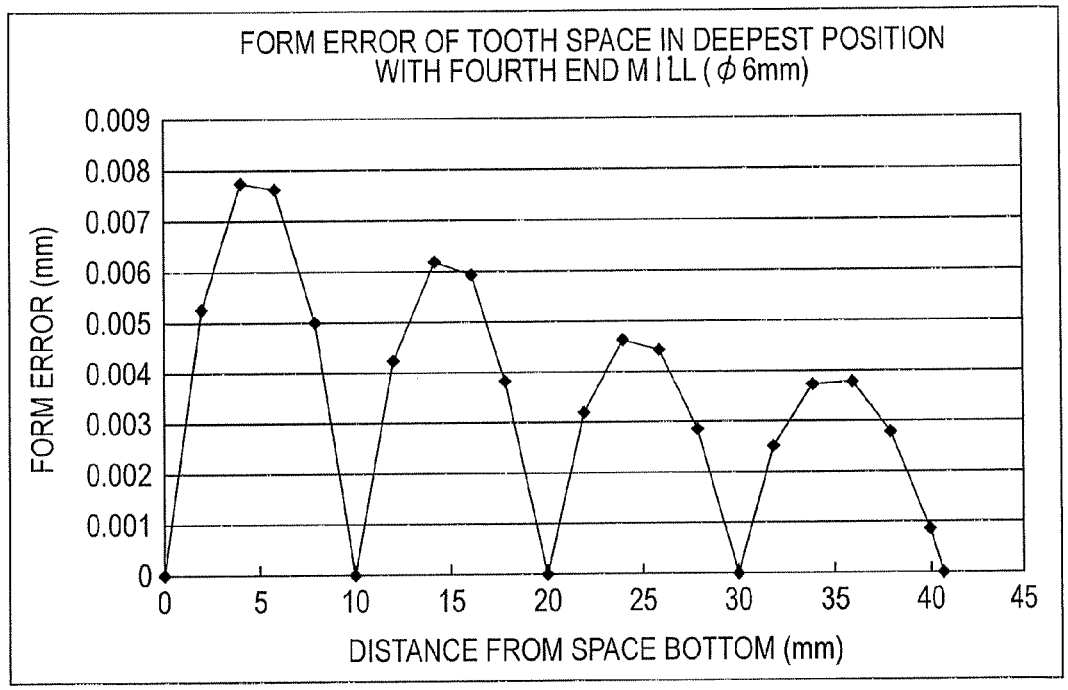
FIG. 18 is a graph indicating form errors of grooves side in a deepest position with the end mill according to Embodiment 1 of the invention.
Figure 19:
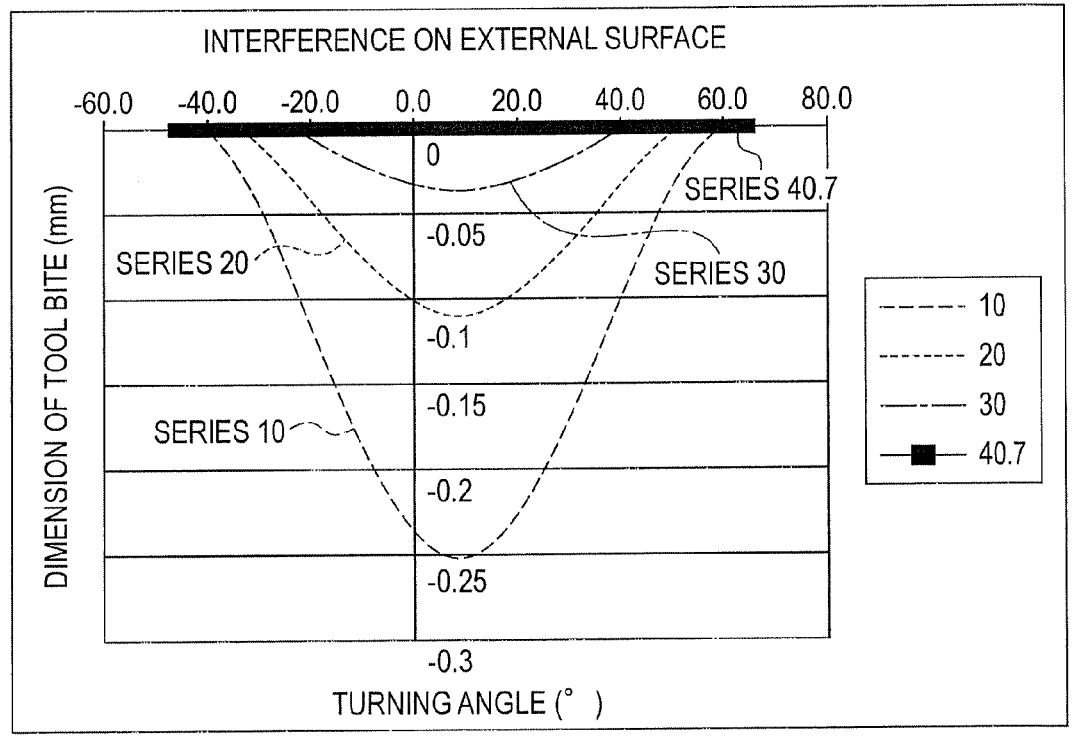
FIG. 19 is a graph indicating an interference on an external diameter surface, which is required for preliminary calculation of a dented dimension of a neck portion with the end mill according to Embodiment 1 of the invention.

FIG. 18 is a graph indicating form errors of grooves side in a deepest position with the fourth end mill 27, according to the invention, having a specific shape, the graph corresponding to FIG. 15. The graph shows form errors of a side in a deepest position of grooves in the case where cut is made 10 mm by 10 mm in grooves depth direction with the cutting edge 42 having a diameter of φ6 mm and a length of 10 mm. In this case, it is found that a form error of grooves side amounts to 8 μm being 1/10 of a conventional one or less. Also, FIG. 19 is a graph indicating an interference on an external surface, which is required for preliminary calculation of a dented dimension d (see FIG. 13) of the neck portion 43 and, for example, a plot 10 in the figure indicates an amount of interference between the external diameter surface and the neck portion 43 when working is performed over 0 to 10 mm from grooves bottom with the neck portion 43 having the same diameter of φ6 as that of the cutting edge 42. As shown in FIG. 19, while working is performed over 0 to 10 mm from grooves, the amount of interference is maximum and a tool byte is as large as 0.25 mm around a turning angle of 10°, at which grooves depth is largest. It is found from this that the neck portion 43 is required to have a dented dimension d of 0.25 mm or more. That is, with the cutting edge of φ6, a dented dimension d of a diameter of the neck portion 43 can be calculated from product specifications and working tool specifications.

Also, a lead angle of each point on grooves side of a screw rotor is found from a center distance 18 and grooves width 54, which constitute product specifications of a screw rotor compressor, and a ratio of rotation of a screw rotor and a gate rotor by the following formula.

Lead angle of each point=tan$^{-1}$ [[(turning radius 31 of tooth space side)/turning radius 32 of tooth side)]×ratio of rotation]

Further, an amount of interference between a tool and a screw rotor on an external surface position can be calculated from a tool diameter and a cutting edge length of the cutting edge 42, a maximum tooth space depth determined by a gate rotor radius 19, a screw rotor diameter 53, and a center distance 18, grooves side lead angle δa in a tooth bottom position, grooves side lead angle δb in a location higher by a length of the cutting edge than a tooth bottom, and grooves side lead angle δc in an external surface position, which angles are for a maximum depth position calculated by the above formula, by the following formula.

Figure 20:
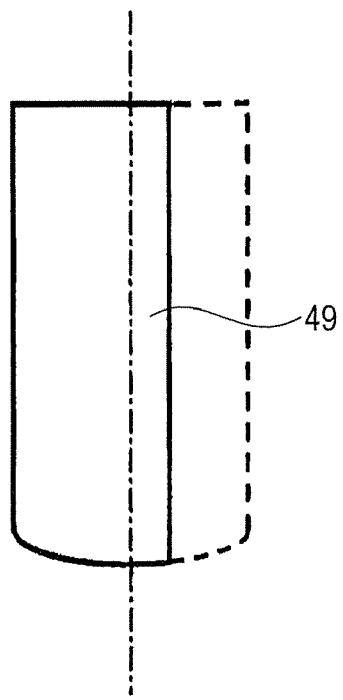
FIG. 20 is a front view showing an example of an asymmetrical shaving byte.

Amount of interference=tool diameter×[(cos((δc−(δa+δb)/2)/cos((δb−δa)/2)]−tool diameter Subsequently, a shaving byte 28 is used to perform a bottom surface finish working E of grooves (FIG. 6(*e*)). The shaving byte 28 comprises a formed tool having a shape, which corresponds to a bottom surface of a screw tooth space, and rotation of a screw rotor and rotation of a tool cooperate to work a bottom surface of a screw tooth space in reciprocation in the same manner as described above. A tool used in the conventional working method may be divertedly used as the shaving byte 28 conformed in shape to a bottom surface of a screw rotor tooth space, which is different every model, and it suffices to change only a mounting method in conformity to the present working apparatus. Also, since the present apparatus enables reciprocation, it may have an asymmetrical tip end as shown in FIG. 20. In this manner, since the process meets a required working accuracy and working with a rotating tool is enabled except grooves bottom finish working process, an improvement in working accuracy can be achieved.

As described above, according to Embodiment 1 of the invention, a rotating tool is used for the finish working of grooves side, so that a relative velocity of a tool and a work makes a cutting speed. As compared with, for example, the case where a shaving byte is used to perform a finish working of grooves side, the cutting speed is increased to make working highly efficient. Also, since the tool is of rotational symmetry, an edge position becomes easy to measure to heighten grooves width in accuracy as compared with the case where a shaving byte is used to perform a finish working of grooves side. Further, as compared with the case where a shaving byte is used to perform finish working of grooves side, a tool is simple to work in that process, in which the fourth end mill according to the invention is used. In addition, while a center line of a screw rotor and a sealing line of refrigerant gases sealed by grooves side and a tool side agree with each other in the embodiment, it suffices to make a sealing line position a reference in the case where a center line of a screw rotor and a sealing line get out of position relative to each other.

Embodiment 2

While the use of the fourth end mill 27 in grooves side finish working process is described in Embodiment 1, a sixth end mill 50 having a smaller diameter than that of the first end mill 25 is used as a tool in Embodiment 2. Since a first process of giving a predetermined cut in a screw tooth space depth direction and performing engraving to a desired depth with the first end mill 25 as a tool, a second process of performing rough working of a screw tooth space side with the second end mill having a smaller diameter than that of the first end mill, as a tool, and a third process of working a screw tooth space bottom surface with the third end mill having a rounded (R) tip end, as a tool are the same as those of Embodiment 1, an explanation is omitted for the sake of avoiding duplication.

Figure 21:
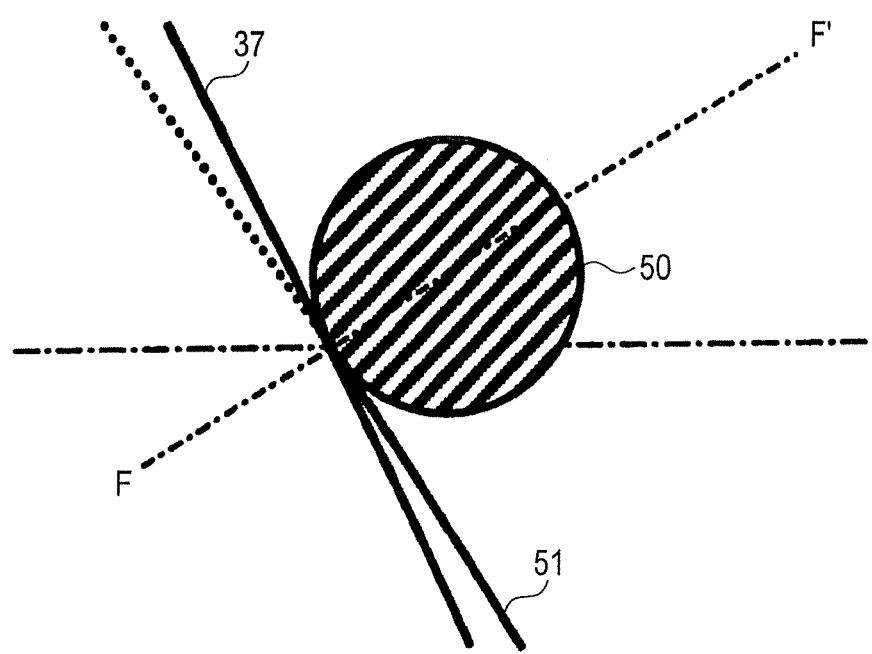
FIG. 21 is a view illustrating lead and a tool position in end mill finish working according to Embodiment 2 of the invention.
Figure 22:
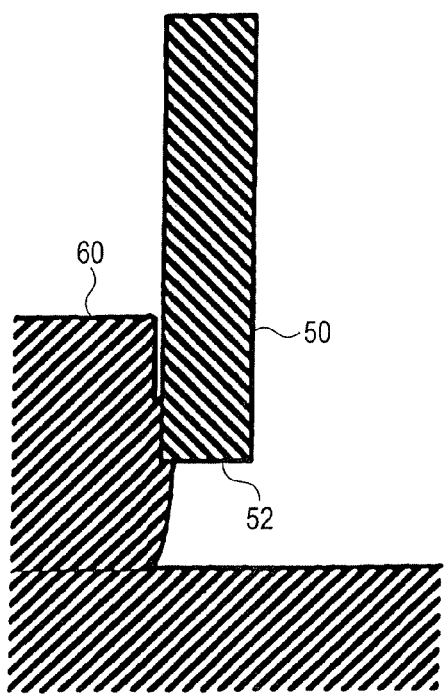
FIG. 22 is a view illustrating an axial cut position in end mill finish working according to Embodiment 2 of the invention.

FIGS. 21 and 22 show the case where the sixth end mill 50 is used. FIG. 21 is a view illustrating lead and a tool position in finish working and FIG. 22 is a view illustrating an axial cut position in finish working of a screw tooth space side. That is, working is divided in grooves depth direction to provide a cutter pass to move a tool center position so as to bring the same into contact with both a lead 51 at a tip end 52 of the sixth end mill 50 and the lead 37 on the external surface 60. With a conventional end mill, a geometric form error is generated on a screw tooth space side as illustrated in FIGS. 14 and 15 but this is far improved by adopting the working method described above.

Figure 23:
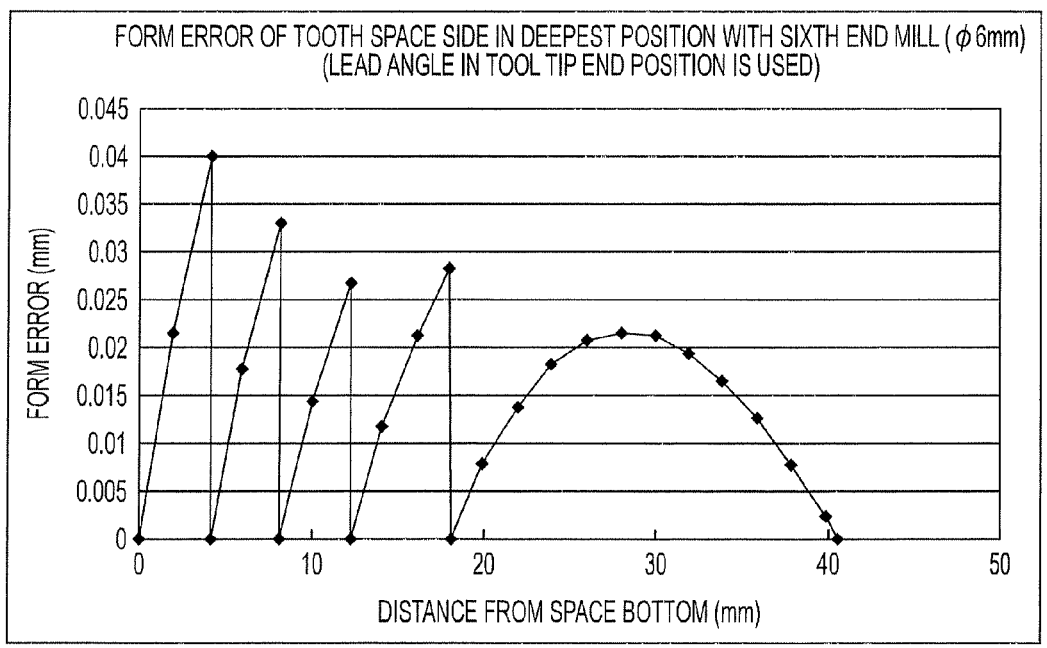
FIG. 23 is a graph indicating form errors of grooves side in a deepest position in end mill finish working according to Embodiment 2 of the invention.

FIG. 23 is a graph indicating form errors of grooves side in a deepest position with the sixth end mill 50 when the cutter pass described above is adopted, and showing a state when the lead at the end mill tip end 52 is made use of. The graph indicates form errors of grooves side in a deepest tooth space position in the case where the sixth end mill 50 has a diameter of φ6 mm and cut is made in five stages of 22.7 mm, 6 mm, 4 mm, 4 mm, 4 mm in a space depth direction. In this case, it is found that a form error of grooves side amounts to 40 μm, which is ½ that of the conventional case shown in FIG. 15. Since a joint portion of cuts has a large step as compared with Embodiment 1, however, it suffices to make cuts fine in order to dissolve an increase in step. In addition, it suffices that shift from a center line of a screw rotor 1 be corrected on Y axis.

Since a rotating tool is used for the finish working of grooves side according to the invention, the number of rotation can be heightened to be equal to that in an ordinary end mill working and working is made high in efficiency as compared with the case where a shaving byte is used to perform a finish working of grooves side. Also, the rotating tool makes measurement in a cutting edge position easy to heighten grooves width in accuracy.

Also, a screw rotor 1 worked in the method according to Embodiment 1 and Embodiment 2 forms smooth projections, of which surfaces are at most 40 μm, to be small in surface roughness, so that gate rotors can be arranged on the left and right of the screw rotor with high accuracy so that a plurality of tooth spaces 2 of the screw rotor 1 are made plane perpendicular to a plurality of teeth 4 of the gate rotors 3*a*, 3*b*. A screw rotor compressor of good performance can be manufactured by covering outer peripheries of the screw rotor and the gate rotors with a casing and closing screw rotor tooth spaces 2 by the gate rotors, which rotate together with rotation of the screw rotor, to confine refrigerant gases. In particular, a screw compressor is good in initial running-in and made small in slide frictional resistance at the initial stage or the like whereby a screw compressor can be improved in operating characteristic.

In addition, according to Embodiment 1 and Embodiment 2, an axis of rotation of a work and an axis of turning of a tool may be controlled at a time, and two axes of rotation of a work and two axes of turning of a tool may be used. It suffices to form a screw tooth space by controlling at least two axes at a time.

What is claimed is:

1. A method of working a screw rotor by controlling at least two axes, that is, rotation of a work and turning of a tool at a time to form a screw tooth space, the method comprising a first step of using a first end mill as the tool to make a predetermined cut in a depth direction of the screw tooth space to perform engraving to a predetermined depth, a second step of using a second end mill, which has a smaller diameter than that of the first end mill, as the tool to perform rough working on a side of the screw tooth space, a third step of using a third end mill, which has a rounded tip end, as the tool to perform rough working on a bottom surface of the screw tooth space, a fourth step of using a fourth end mill, which has a cutting edge portion being shorter than a depth of the screw tooth space in a depth direction and a neck portion being smaller in diameter than the cutting edge portion, as the tool to perform finish working on the side of the screw tooth space, and a fifth step of using a shaving byte, which is shaped in conformity to the bottom surface of the screw tooth space, as the tool to perform finish working on the bottom surface of the screw tooth space, wherein the neck portion has a dented dimension determined by the following formula as an amount of interference between the fourth end mill and the screw rotor:

amount of interference=tool diameter×[(cos((δc−(δa+δb)/2)/cos ((δb−δa)/2)]−tool diameter, where δa represents a grooves side lead angle in a tooth bottom position at a maximum groove depth position, δb represents a grooves side lead angle in a location higher than the tooth bottom position by a length of the cutting edge portion, and δc represents a grooves side lead angle in an external surface position.

2. The method of working a screw rotor, according to claim 1, wherein working in the fourth step is divided in a depth direction by a length, which corresponds to the cutting edge portion of the fourth end mill, to provide a cutter pass, in which a tool center is moved so that an outer periphery cylinder portion of the cutting edge portion contacts with both leads, which are generated by upper and lower portions of the cutting edge portion.

3. A method of manufacturing a screw compressor, comprising:

a step of working a plurality of screw tooth spaces to form a screw rotor using a first end mill as the tool to make a predetermined cut in a depth direction of a screw tooth space to perform engraving to a predetermined depth by controlling at least two axes, that is, rotation of a work and turning of a tool at a time, using a second end mill, which has a smaller diameter than that of the first end mill, as the tool to perform rough working on a side of the screw tooth space, using a third end mill, which has a rounded tip end, as the tool, to perform rough working on a bottom surface of the screw tooth space, using a fourth end mill, which has a cutting edge portion being shorter than a depth of the screw tooth space in a depth direction and a neck portion being smaller in diameter than the cutting edge portion, as the tool to perform finish working on the side of the screw tooth space, and using a shaving byte, which is shaped in conformity to the bottom surface of the screw tooth space, as the tool to perform finish working on the bottom surface of the screw tooth space, wherein the neck portion has a dented dimension determined by the following formula as an amount of interference between the fourth end mill and the screw rotor:

amount of interference=tool diameter×[(cos((δc−(δa+δb)/2)/cos ((δb−δa)/2)]−tool diameter, where δa represents a grooves side lead angle in a tooth bottom position at a maximum groove depth position, δb represents a grooves side lead angle in a location higher than the tooth bottom position by a length of the cutting edge portion, and δc represents a grooves side lead angle in an external surface position, a step of arranging gate rotors on the left and right of the screw rotor so that a plurality of screw rotor tooth spaces of the screw rotor are made plane perpendicular to a plurality of teeth of the gate rotors, a step of covering outer peripheries of the screw rotor and the gate rotors with a case, and a step of closing the screw rotor tooth spaces by the gate rotors, which rotate together with rotation of the screw rotor, to confine refrigerant gases.

* * * * *